Patented Oct. 25, 1949

2,485,573

UNITED STATES PATENT OFFICE 2,485,573

THIOCYANATED PHOSPHITE ESTERS

W E Craig, Philadelphia, and William F. Hester, Drexel Hill, Pa., assignors to Röhm & Haas Company, Philadelphia, Pa., a corporation of Delaware No Drawing. Application October 5, 1945, Serial No. 620,636

2 Claims. (Cl. 260—454)

This invention relates to organic compounds of phosphorus. More particularly, it deals with derivatives of esters of phosphorus acid having the formula $$(RO)_2POCH(OH)R'$$

wherein R is a monovalent organic group free from reactive hydrogen atoms; that is, hydrogen atoms which would readily react with reagents such as aldehydes, and R' is a monovalent aliphatic group obtained from aliphatic aldehydes, OHCR', preferably those aldehydes which carry a halogen atom, particularly a halogen on the carbon contiguous to the carbonyl group. The phosphorus compounds in which R' is a halogenated monovalent aliphatic group of one to seven carbon atoms form an interesting and valuable natural group. The compounds in which R' is such a monovalent halogenated aliphatic group and in which R is a monovalent aliphatic group which is free of reactive hydrogen and which comprises one to twelve carbon atoms are useful as toxic agents in insecticidal compositions. When R is a hydrocarbon group sufficiently large to ensure solubility of these phosphorus compounds in hydrocarbons, they are useful as additives for lubricating oils and related compositions. Many of the new compounds are useful as solvents and plasticizers.

Dialkyl acid phosphites are known. The action of an alcohol on PCl₃ leads to the normal ester of H₃PO₃, which decomposes in the presence of liberated HCl to the acid ester and alkyl chloride, thus $$3ROH + PCl_3 \rightarrow (RO)_3P + 3HCl \rightarrow (RO)_2POH + RCl$$

It is now found that aldehydes add to the acid ester to form the compounds $$(RO)_2POCH(OH)R'$$

The acid phosphite esters may be dialkyl esters such as the methyl, ethyl, butyl or octyl esters or they may be cycloaliphatic, aryl, aralkyl, or other organic esters such as benzyl or tetrahydrofurfuryl esters. The group R may, on the other hand, be substituted with halogens such as chlorine or bromine, with a cyanogen, a thiocyanate, or a nitro group, or with an ether group, or with any other neutral group or substituent which does not contain a reactive hydrogen atom. Typical of the diesters which may be used are:

(C₂H₅O)₂POH
(C₄H₉O)₂POH
(C₆H₁₁O)₂POH
(C₆H₅CH₂O)₂POH
(C₂H₅OC₂H₄O)₂POH
(ClCH₂CH₂O)₂POH
[(CH₃)₂C(NO₂)CH₂O]₂POH
(NCSCH₂CH₂OCH₂CH₂)₂POH
(BrCH₂CH₂OCH₂CH₂)₂POH
(C₆H₁₃(ClCH₂)CHO)₂POH
(C₆H₁₃(CH₃)CHO)₂POH
(C₁₂H₂₅O)₂POH
[(CH₃)₂(CN)CO]₂POH
(C₆H₅O)₂POH
(C₈H₁₇O)₂POH
(CH₂=CH—CH₂O)₂POH

The aldehyde in the preferred forms of this invention is an aliphatic one having at least one halogen on the alpha carbon atom and having a total of two to eight carbon atoms. Typical haloaldehydes are chloral, dichloroacetaldehyde, chloropropionaldehyde, alpha-bromobutyraldehyde, bromohexaldehyde, tribromobutyraldehyde, alpha-chloro-alpha, beta-dibromobutyraldehyde, alpha-bromooctylaldehyde, etc. On the other hand, aldehydes free from halogen may be reacted with the diesters of phosphorous acid, such as formaldehyde, acetaldehyde, butyraldehyde, 2-ethylhexaldehyde, or octylaldehyde.

The diester and aldehyde are reacted together upon being mixed with or without an organic solvent. The reaction may start at room temperature and be completed at higher temperatures which are reached spontaneously or with external heating. Temperatures of 20° to 150° C. may be used. The product may be worked up by washing, charcoaling, or extracting, and in some cases by crystallizing. It is generally not practical to attempt purification by distillation.

The products of this invention are readily acylated with carboxylic anhydrides or with acyl halides, yielding new compounds of the formula $$(RO)_2POCH(OCOR'')R'$$

R'' being the residue of a carboxylic acid supplied by the acylating reagent.

This invention is illustrated by the following examples.

Example 1

To 1.44 kg. (10.5 mols) of phosphorus trichloride there was slowly added 2.55 kg. (31.5 mols) of anhydrous ethylene chlorohydrin while the mixture was stirred and cooled in an ice-salt bath so that the temperature did not rise above 40° C. After the addition, the reaction mixture was stirred one-half hour, then concentrated on a boiling water bath at reduced pressure to give 2267 g. of light brown oil, which was essentially $(ClCH_2CH_2O)_2POH$ To this oil there was added during a period of fifteen minutes, while the mixture was stirred without being cooled, 1.55 kg. (10.5 mols) of freshly distilled chloral. The temperature rose from 24° C. to 140° C. After the mixture had been stirred for three hours, the temperature had dropped to 43° C. and the resulting oil was poured into 5 liters of ice water, while the mixture was rapidly stirred, to give 3.2 kg. of white solid melting at 85°–92° C. This is an 86% yield of $(ClCH_2CH_2O)_2POCH(OH)CCl_3$ The solid was readily acetylated by refluxing three hours with an equal weight of acetic anhydride and a trace of sulfuric acid. The product was a brown oil which analyzed 43.29% chlorine. The calculated chlorine content for $(ClCH_2CH_2O)_2POCH(OCOCH_3)CCl_3$ is 44.71%.

Example 2

A reaction mixture consisting of 52 g. of bis(beta-chloroethyl)phosphite and 44 g. of butyl chloral was allowed to stand overnight, then was dissolved in ethylene dichloride, washed thoroughly with water, dried over calcium chloride, and concentrated on a boiling water bath at reduced pressure to give 60 g. of viscous brown oil which was essentially $(ClCH_2CH_2O)_2POCH(OH)CCl_2CHClCH_3$

Example 3

To 34 g. of a reaction product made by adding 177 g. of $HOCH_2CH_2OCH_2CH_2SCN$ to 83 g. of $PCl_3$ there was added 18 g. of butyl chloral. After the mixture had stood overnight, it was dissolved in ethylene dichloride, washed thoroughly with water, dried over calcium chloride and concentrated on a boiling water bath at reduced pressure to give 42 g. of brown oil which was $(NCSCH_2CH_2OCH_2CH_2O)_2$
$POCH(OH)CCl_2CHClCH_3$ contaminated with some $NCSCH_2CH_2OCH_2CH_2Cl$

Example 4

A mixture of 54 g. of bis(beta(betachloroethoxy)ethyl)phosphite (made by adding three equivalents of diethylene glycol chlorohydrin to phosphorus trichloride) and 26 g. of chloral was allowed to stand overnight. The resulting oil was dissolved in ethylene dichloride, washed thoroughly with water, dried over calcium chloride and concentrated on a boiling water bath at reduced pressure to give 61 g. of viscous yellow oil which was at 78% yield of $(ClCH_2CH_2OCH_2CH_2O)_2POCH(OH)CCl_3$

Example 5

When 1.5 mols of capryl alcohol was reacted with 0.5 mol of phosphorus trichloride, there was obtained as a residue, after removal of capryl chloride, 144 g. of a light yellow oil which on analysis gave 10.55% phosphorus. The calculated phosphorus content for $(n-C_6H_{13}(CH_3)CHO)_2POH$ is 10.10%. To 46 g. of the above oil there was added 22 g. of chloral and a reaction was evidenced by a temperature rise to 60° C. After the product was cooled in benzene solution, it was washed with water, dried over sodium sulfate and concentrated on a boiling water bath at reduced pressure to give 48.5 g. of light brown oil containing primarily $(n-C_6H_{13}(CH_3)CHO)_2POCH(OH)CCl_3$

Example 6

A reaction mixture consisting of 172 g. of acetonecyanhydrin, 137 g. of phosphorus trichloride, and 350 cc. of dry benzene was refluxed five hours and, after it was washed with water and 10% sodium carbonate solution, there was isolated 117 g. of clear yellow oil which analyzed 12.74% nitrogen and 15.90% phosphorus. The calculated nitrogen and phosphorus values for $((CH_3)_2(CN)CO)_2POH$ are 12.96% and 14.29% respectively. To 22 g. of the above oil there was added 15 g. of chloral and the temperature immediately rose to 67° C. After the reaction mixture had stood overnight, it set to a semi-solid. Washing with water gave 16 g. of a white granular solid melting at 135–143° C. which on analysis gave 7.10% nitrogen. The calculated nitrogen content for $((CH_3)_2(CN)CO)_2POCH(OH)CCl_3$ is 7.70%.

Example 7

To a stirred mixture of 261 g. of allyl alcohol in 237 g. of pyridine there was added 205 g. of phosphorus trichloride while the mixture was stirred and the temperature maintained at 30°–40° C. After the stirring had been continued for one hour after the addition, ethylene dichloride was added and pyridine hydrochloride was filtered off and the filtrate concentrated on a boiling water bath at reduced pressure to give 292 g. of viscous yellow oil.

To 130 g. of the above oil there was added 118 g. of chloral and the temperature rose to 60° C. After the reaction mixture had stood some time, it was concentrated on a boiling water bath at reduced pressure to give 196 g. of clear light brown oil which was chiefly $(CH_2=CHCH_2O)_2POCH(OH)CCl_3$ By the same procedure there may be reacted $(ClCH_2CH_2O)_2POH$ and $OHCCHCl_2$ to give $(ClCH_2CH_2O)_2POCH(OH)CHl_2$ With formaldehyde there is obtained $(ClCH_2CH_2O)_2POCH_2OH$ while butyraldehyde yields $(ClCH_2CH_2O)_2POCH(OH)CH_2CH_2CH_3$ and octyl aldehyde yields $(ClCH_2CH_2O)_2POCH(OH)C_7H_{15}$ The compound $((ClCH_2CH_2O)_2POCH(OH)CCl_3$ was made up into a self-emulsifying insecticidal concentrate with pine oil and a polygylcerol-lauric acid emulsifier. When applied in an aqueous spray containing one per cent of the compound, there was obtained a 99% control of Mexican bean beetle larvae on bean plants. At 0.5% the control was 93% and at 0.125% the control was 80%. A dust containing 1% of this compound gave complete control of bean beetle larvae. Other reaction products from chlorinated aldehydes also act as stomach poisons.

A mixture was made of 2 parts of $(NCSC_2H_4OC_2H_4O)_2POCH(OH)CCl_2CHClCH_3$ and 98 parts of clay and applied to bean plants infested with black bean aphids. After 24 hours, a kill of 88% was obtained.

This same compound was used at a 5% level in a deodorized kerosene against house flies by the Peet-Grady procedure. A knock-down of 100% was observed within ten minutes and a kill of +17 was obtained after 24 hours compared to the 1944 O. T. I. Against these insects these compounds acted as contact poisons and this is particularly true of compounds of the formula $[NCS(CH_2CH_2O)_n]_2POCH(OH)R'$ where $n$ is a small integer, such as one or two.

By addition of saturated aliphatic aldehydes to acid esters of phosphorous acid there are obtained new compounds of considerable interest and of wide utility.

We claim:
1. Compounds of the formula

$[NCS(CH_2CH_2O)_n]_2POCH(OH)R'$ where in $n$ is an integer from one to two and R' is a haloalkyl group of one to seven carbon atoms.

2. A compound of the formula $(NCSCH_2CH_2OCH_2CH_2O)_2POCH(OH)CCl_2CHClCH_3$

W E CRAIG.
WILLIAM F. HESTER.

REFERENCES CITED

The following references are of record in the file of this patent:

UNITED STATES PATENTS

| Number | Name | Date |
|---|---|---|
| 1,936,985 | Lommel et al. | Nov. 28, 1933 |
| 2,169,185 | Shoemaker et al. | Aug. 8, 1939 |
| 2,173,638 | Rozenbrock | Sept. 19, 1939 |
| 2,372,244 | Adams | Mar. 27, 1945 |

OTHER REFERENCES

Carre, "Bull. Soc. Chim. France," 3rd series vol. 27, pages 261–269 (1902).

Beilstein, "Handbuch der Org. Chem.," vol. I, 4th ed. 1918, page 337.

"Chemical Abstracts," vol. 13 (1919), pages 2865–2866, Abstract of an Article by Milobendzke et al., "Chemik Polski," vol. 15, 34–37 (1917).